United States Patent
Branch et al.

(10) Patent No.: US 7,585,439 B2
(45) Date of Patent: Sep. 8, 2009

(54) MANUFACTURE OF FULLY RECYCLABLE FOAMED POLYMER FROM RECYCLED MATERIAL

(75) Inventors: Gregory L. Branch, Stanwood, WA (US); Trevor Wardle, Ashland, KY (US)

(73) Assignee: Micro Green Polymers, Inc., Arlington, WA (US)

(*) Notice: Subject to any disclaimer, the term of this patent is extended or adjusted under 35 U.S.C. 154(b) by 0 days.

(21) Appl. No.: 10/557,758

(22) PCT Filed: May 14, 2004

(86) PCT No.: PCT/US2004/015245

§ 371 (c)(1),
(2), (4) Date: Nov. 17, 2005

(87) PCT Pub. No.: WO2004/104072

PCT Pub. Date: Dec. 2, 2004

(65) Prior Publication Data

US 2006/0284331 A1      Dec. 21, 2006

Related U.S. Application Data

(60) Provisional application No. 60/471,477, filed on May 17, 2003.

(51) Int. Cl.
*B29C 44/20* (2006.01)
*B29C 44/56* (2006.01)
*B29C 51/02* (2006.01)

(52) U.S. Cl. .............. 264/50; 264/51; 264/102; 264/345; 264/234; 264/235; 264/321

(58) Field of Classification Search .......... 264/50, 264/911, 321
See application file for complete search history.

(56) References Cited

U.S. PATENT DOCUMENTS

| | | | | |
|---|---|---|---|---|
| 3,937,777 A | * | 2/1976 | Wienand et al. | 264/53 |
| 4,304,747 A | * | 12/1981 | Lake | 264/156 |
| 4,386,188 A | * | 5/1983 | Grancio et al. | 525/96 |
| 4,424,287 A | * | 1/1984 | Johnson et al. | 521/74 |
| 4,693,856 A | * | 9/1987 | Rubens et al. | 264/45.4 |
| 5,217,660 A | * | 6/1993 | Howard | 264/45.4 |
| 5,223,545 A | * | 6/1993 | Kumar | 521/51 |
| 5,684,055 A | * | 11/1997 | Kumar et al. | 521/79 |
| 2009/0104420 A1 | * | 4/2009 | Nadella et al. | 428/218 |

FOREIGN PATENT DOCUMENTS

EP          371392          * 11/1989

* cited by examiner

*Primary Examiner*—Edmund H. Lee
(74) *Attorney, Agent, or Firm*—Thomas E. Loop

(57) ABSTRACT

A solid state foaming process permits the use of up to 100% recycled pre- and post-consumer polymer for the manufacture of foamed polymer material and thermoformed foamed polymer articles. The process enables the optional formation of integral unfoamed skins of controllable depth and crystallinity on foamed polymeric materials suitable for a wide variety of applications. Because this process does not alter the underlying chemistry of the material all scrap from the manufacturing process may be reused without additive to form new foamed polymeric materials and articles.

8 Claims, 3 Drawing Sheets

MANUFACTURE OF FULLY RECYCLABLE FOAMED POLYMER FROM RECYCLED MATERIAL

CROSS-REFERENCE TO RELATED APPLICATIONS

This application claims priority from U.S. Provisional Application No. 60/471,477 filed May 17, 2003, now abandoned, entitled THERMOFORMED FOAMED THERMOPLASTIC PACKAGING, and PCT Application No. PCT/US2004/015245, filed May 14, 2004, entitled MANUFACTURE OF FULLY RECYCABLE FOAMED POLYMER FROM RECYCLED MATERIAL, which applications are incorporated herein by reference in their entireties.

BACKGROUND OF THE INVENTION

1. Field of the Invention

This invention relates to a process of creating polymeric foams from 0-100% recycled polymers, the foam created thereby retaining its original chemical structure and chemistry so that it may readily be recycled again using existing recycling processes to recover solid polymer which may in turn be foamed again. More specifically, this invention relates to the creating of foam or cellular polymers of density ranges of 3 to 99% of solid using any combination of virgin polymer, recycled pre- and post-consumer solid polymer, and recycled foam polymer that has been foamed and optionally thermoformed by the method of this invention including trim and other scrap material from the process of manufacturing foamed polymer articles.

2. Description of the Related Art

Articles of foamed polymeric material are ubiquitous in modern life. In industries ranging from food service and distribution, to packaging, to construction, modern society demands a plethora of items made of foamed polymer. Heretofore, however, the general manufacturing processes used to meet the demand for such items have inherent inefficiencies and high environmental costs.

A substantial volume of foamed polymeric articles are fabricated of solid state microcellular polymeric foam. Typically, such foams have a bubble density of more than $10^8$ cells per $cm^3$ with bubble diameters on the order of 10 μm. Compared with conventional solid polymers, solid state foamed polymers offer the possibility of a 3-99% reduction in material used while maintaining the essential mechanical properties of the unfoamed polymer. This in turn offers significant savings in material and transportation costs. Furthermore, foamed polymers are good insulators in general, so that materials of microcellular polymeric foam may be advantageously employed as thermal insulators in building construction and, indeed, are preferred materials for articles such as containers for hot and cold food and beverages.

The large amount of plastics in landfills is a widely recognized problem. Volume, degradability and hazards of waste are primary concerns regarding the waste stream. While efforts have been made to reduce the volume of waste, concerns continue regarding the accumulation of non-decomposable waste in the form of plastics and plastic foams. Effective, comprehensive recycling of pre- and post-consumer waste provides solutions to these concerns.

Heretofore, however, waste foamed polymeric material and articles (whether thermoformed or not) have been extraordinarily difficult to recycle. The prior art processes of foaming and forming polymer bring about irreversible changes in its constituents such that uses for the resulting waste foamed polymer are greatly exceeded by the amount of waste produced. In recent times, the majority of manufacturing scrap and pre- and post-consumer waste foamed polymer has simply been discarded, occupying our landfills.

Prior art foamed thermoformed polymeric articles have typically been manufactured in a process involving two stages: foaming extrusion and thermoforming. Foaming extrusion, as discussed in more detail below, entails producing or forcing a non-reactive gas into a molten polymer mixture, thereby forming bubbles in the melt. The mixture is allowed to cool and harden around the bubbles, which become small, gas-filled cells in the now solid foam material. Thermoforming, as will also be discussed in greater detail below, entails heating solid foam material until it is soft and pliable and then molding it into the shape of articles which the foam assumes in rigid form upon cooling.

As is well known to those in the art, for the prior art production of foamed articles of acceptable quality, the molten polymer mixture that is extruded must be of a certain minimum viscosity and melt hardness. In their pure, unaltered forms, the viscosity and melt hardness of the principal polymers used in the manufacture of thermoformed foam articles are inadequate for such purpose, particularly so in the case of polyesters such as polyethylene terephthalate (PET) and polyethylene (PE). Accordingly, in the prior art, various treatments of pure polymer resin are employed to confer proper viscosity to the mixture for foaming extrusion.

One treatment commonly employed to enhance polymer viscosity is simply to add viscosity enhancing additives to the resin mixture as it is melted. In the case of PET, such additives include very high molecular weight polyesters or branched polyesters, non-crystalline copolyesters, branching agents as taught in U.S. Pat. No. 5,288,764 to Rotter et al., and high molecular weight vinyl aromatic modifiers as taught in U.S. Pat. No. 5,310,799 to Carson et al. As is well known to those of skill in the art, the precise composition and proportion of additive, varying greatly with the polymer to be foamed and the requirements of the specific foaming extrusion process under consideration, is generally determined empirically on a case by case basis by trial and error.

Another treatment of polymer resins commonly employed in the production of prior art foamed polymers is cross-linking, whereby the polymer molecules in the polymer mixture are caused to be partially cross-linked with one another. Cross-linking is used to enhance polymer melt viscosity to enable or facilitate foam extrusion for many polymers, such as polystyrene and PET. In the case of polyethylene, cross linking of the polymer resin is used to increase the allowable service temperature of the polymer foam for such applications as under-hood automotive and steel roofing insulation. Cross-linking is usually induced by causing the formation of free-radicals in the polymeric material which then cause cross-linking between polymer molecules.

Most commonly, cross-linking of polymers by free radical reaction is accomplished by one of three methods: exposing melt-extruded sheet polymeric material to ionizing radiation; melt-mulling peroxide into the thermoplastic resin at a temperature below the decomposition point of the peroxide then heating the mixture to a temperature above the decomposition point of the peroxide; or melt-mulling the resin with an organo-functional silane. For some polymers, such as polypropylene homopolymers and copolymers, efficient cross-linking by free radical reaction requires the further addition of a cross-linking promoter or sensitizer such as: multifunctional vinyl monomers and polymers; divinylbenzene; acrylates and methacrylates of polyols; allyl alcohol derivatives; polybutadiene; and co-polymers of α-olefins and a non-conjugated diene.

In general, successful cross-linking by free radical creation and reaction requires that the free radicals produced principally cause formation of cross-linked polymers and only minimally cause scission of polymer molecules. For applications in which free radical formation results in substantial chain scission in polymer molecules, a multi-functional azide is instead employed to bring about cross-linking through a nitrene insertion reaction.

It is also often desirable to increase the rate at which semi-crystalline polymers such as PET crystallize when they are heated to temperatures below their melting point. By doing so, it is possible use semi-crystalline polymers economically to manufacture articles whose utility depends upon qualities possessed by the polymer only when it has a high degree of crystallinity. For example, foamed articles made of highly crystallized PET may be manufactured that are suitable for use in high service or operating temperatures at which less crystallized foamed PET articles are unsuitable. However, in the prior art it is not economical to form such crystallized foamed PET articles starting with standard foamed PET because of its relatively slow rate of crystallization.

A group of additives is used in the melt mixture in the prior art to enhance the crystallization rate of such semi-crystalline polymers. In the case of PET, polyolefins are added to the melt mixture to form a grade of PET, known as CPET, that is used to make high service temperature objects. The polyolefins serve as a nucleating agent to enhance crystallization of formed, foamed articles of CPET. The current industry practice for producing high service temperature objects is to form solid sheet (unfoamed) CPET and then raise the crystallinity level after forming using additional heat. Without the additives, the crystallinity level of the PET rises too slowly with applied heat for economic production of highly crystallized articles suitable for high service temperatures.

In any case, as is clear from the foregoing, and as is well known to those of skill in the art, virgin polymeric resin must be considerably chemically or molecularly modified, generally either by cross-linking molecules in the polymer or by processes involving melting the polymer with the addition of other compounds, before it can be successfully extruded as foam in the prior art. It is also clear that, in the prior art, solid or foamed PET can not economically be turned into high service temperature objects without additives and that polyethylene foam can not serve in high temperatures without cross linking.

Turning to examine the prior art foam extrusion process in more detail, extrusion involves foaming melted polymer with gas. Gas may be produced chemically by additives within the melted polymer, or it may be physically introduced into the melt by blowing. In some applications, both chemical production and blowing of gas are employed for foaming.

For chemical foaming, a pelletized resin of a polymer, such as polystyrene or polyethylene terephthalate (PET), treated for extrusion as described above, is fed into an extruder with blowing agent, such as p,p'-oxybis(benzenesulfonyl hydrazide), azodicarbamide, alkaline earth metal carbonates or bicarbonates such as calcium carbonate, magnesium carbonate or sodium bicarbonate, and combinations of an alkaline earth metal carbonate or bicarbonate and one or more organic acids such as citric acid.

In addition, the treated resin mixture may be further mixed with optional polymer scrap, the relative proportion of which, significantly, must be limited, as will be discussed in greater detail below.

In the extruder, the resin mixture is heated above the polymer's glass liquefaction or melt temperature (about 265 deg. C. for PET and about 240 deg. C. for polystyrene). If physical blowing is used to cause foaming, resultant melted mixture is then blown with carbon dioxide, or a hydrocarbon gas such as pentane, or an HFC (fluorocarbon) gas to produce foam. On exiting the extruder, the foamed sheet may have uneven rounded edges. On cooling and solidifying, the foamed material is typically cut and trimmed into sheets which are wound into rolls. The rolls of foamed polymer are then generally taken to an outside storage area for several days of curing prior to further processing.

The curing process is generally necessary, for the following reasons. Because of thermal contraction of the foaming gas, the now rigid cells in the newly cooled foamed polymer contain the foaming gas at a pressure considerably less than atmospheric pressure, on the order of 0.5 atmospheres. Because the cell walls are more permeable to atmospheric gases than to the various gasses used in foaming gas, during curing the atmospheric gases osmotically penetrate the cells in the foamed polymer, actually increasing the pressure in the cells to above atmospheric pressure, on the order of 1.5 atmospheres. The additional pressure in the foamed polymer cells facilitates thermoforming and in fact results in secondary expansion of the polymer material during the thermoforming stage.

During curing also, however, trapped foaming gas escapes from the foamed polymer into the atmosphere. When residual foaming gas is undesirable in the finished product, as may often apply to polymers foamed with hydrocarbon gas, it has been desirable with the prior art to allow the escape of trapped foaming gas. However, the gases released during curing in the prior art contribute to environmental pollution. Hydrocarbon gas release contributes to low altitude smog, while HFC fluorocarbon gas release is known to have an ozone-destructive effect.

In the stage of thermoforming articles of foamed polymer, sheets of foamed polymer are fed through an oven to heat the polymer close to its softening point. The hot polymer sheet is then forced into molds by vacuum, air or mechanical pressure. As is well known to those of skill in the art, for prior art untreated foamed polymer in general, if open molding is used the foamed material on the open side of the mold is unacceptably porous and uneven for most applications, and so closed molding is generally used. On cooling to the point where it is again somewhat rigid, the molded foam sheet is fed through a trim press where the desired articles are cut from the thermoformed sheet by a punch and die mechanism.

Both stages in the prior art process of producing thermoformed foamed articles result in the creation of scrap polymer. In the extrusion stage, scrap consists principally of excess foamed polymer from the extruder in foam sheet form and results from machine start-ups, and size and color changes as well as scrap from cutting and trimming rounded edges. In the thermoforming stage, scrap comprises principally trimmings (intrinsic to the thermoforming process) and to a lesser extent rejected defectively formed articles. While efficiencies in production have been employed to reduce the amount of scrap in the prior art process of manufacturing foamed polymer articles, typically only 60 to 75% of the polymer is fabricated into articles on a single pass, the remainder set aside as scrap.

For environmental reasons, it is highly desirable to recycle the scrap resulting from the fabrication of thermoformed formed articles. Ideally manufacturing whereby scrap from manufacture is simply refoamed and thermoformed in the normal production process, would address the need for recycling of foamed polymer scrap. However, heretofore such manufacture of foamed polymeric materials has been severely limited.

As discussed above, in the prior art some of the foamed polymer scrap from the manufacturing process may be reused to make new foam polymer, by inclusion of the scrap in the resin mixture to be melted and extruded. For example, U.S. Pat. No. 6,130,261 to Harfmann teaches processing scrap PET foam for reuse by flaking, pelletizing and then desiccating the scrap material.

In practice, however, there is a relatively low limit in the amount of scrap foam produced by the prior art that can be included in the resin mixture while still producing foamed polymer material and articles of acceptable quality. This is because the prior art finished foamed polymeric material differs not only physically but also chemically to a greater or lesser extent from the initial resin that is melted for foaming in the extruder, for several different reasons discussed in further detail below. The chemically different prior art foamed polymeric material in general is not suitable for inclusion in large proportions in the extrusion resin mixture, thereby limiting the availability of closed-loop manufacturing for such material. Accordingly, as a general rule, foam producing plants limit their reuse of self-generated scrap, if it can be used at all, to at most 20 to 50% by weight of the extrusion resin mixture.

Foamed polymeric material will contain the additives used to enhance the viscosity of the melted resin for extrusion. It may further contain contaminant in the form of residual blowing agent or products of the blowing reaction, such as metallic cations and/or conjugate bases of organic acids such as citrate, depending upon the extrusion process used to manufacture the material. Yet further, it may contain contaminant in the form of residual cross-linking additives and sensitizers. Remelt and extrusion of the material with added blowing agent and/or other contaminants leads to the accumulation of such contaminants with each recycling, thereby altering the composition of the recycled foamed polymer.

Perhaps more significant, as is known to those of skill in the art, when prior art foaming thermoplastic polymers are repeatedly broken up, melted and extruded, their chemical structure breaks down, with average molecular weight of the polymer declining in thermo-oxidative and mechanical degradation with each successive extrusion. While this degenerative effect of recycling is less pronounced for some polymers, such as PET, than it is for others, such as polystyrene, as a general rule the extrudate from a melted polymer foam has significantly lower melt viscosity than the extrudate from which the foam was originally formed. In the case of polystyrene foam, the reduction in melt viscosity from polymer degradation is so pronounced that acceptable extrusion foaming is simply not possible for melt mixtures with high percentages of the recycled foamed polymer. For many other polymers, when higher percentages of recycled foamed polymer are used in the melt mixture for prior art foamed polymers, successful extrusion, if indeed it is possible at all, usually requires the addition of viscosity enhancers to the melted reused foam.

For example, U.S. Pat. No. 5,391,582 to Muschiatti et al. teaches use of functionalized chain extenders and cross-linking agents to enhance the viscosity of recycled PET foam. Among such additives are: acid, epoxy and anhydride functionalized ethylene copolymers; partially neutralized ethylene methacrylic acid and acrylic acid copolymers; polyester thermoplastic elastomers; low molecular weight carboxylic acids, acid anhydrides, polyols, and epoxies. These and other viscosity-enhancing components can be incorporated up to about 20% by weight based on the weight of the recycle PET. When recycle PET is melt blended with such additives, the blended recycle may comprise up to 75% of a resin mixture suitable for extrusion, if the remaining 25% or more of the resin mixture made up of a branched PET component. While such additives may give the resin mixture sufficient viscosity for satisfactory extrusion, however, the resulting extruded foam is no more easily recycled than its progenitor.

Yet another common reason that prior art finished foamed thermoplastic material differs chemically from the polymer resin from which it is formed is that it is often desirable for any of a number of reasons for foamed polymeric articles to possess a relatively impermeable, smooth surface or skin. Such skin may act to improve rigidity, provide a gas barrier, resist abrasion, enhance appearance, enhance stain resistance, and impart other desirable qualities. To achieve such results, prior to or at the time of thermoforming the article, the surface of the foamed polymer sheet is often bonded to a smooth, non-permeable polymer film, typically vinylidene chloride copolymer, known as saran, to form so-called "barrier foam", as taught in U.S. Pat. No. 4,847,148 to Schirmer.

It is found, however, that when barrier foam scrap containing saran is heated to the foam polymer melt temperature in the extruder, it burns and cannot be used for extrusion. To address the problem of recycling barrier foam scrap, film materials other than saran have been used. For example, U.S. Pat. No. 5,330,596 to Gusavage et al. teaches use of ethylene vinyl alcohol, acrylonitrile copolymers and/or nylon copolymers for barrier film. While scrap from such barrier foam may be included up to certain proportions in the extruder resin melt, it is nonetheless different in composition from the virgin foaming polymer resin and results in a somewhat different extrudate. Furthermore, an extruded foam polymer, even with a recyclable barrier layer, suffers from chemical degradation on subsequent remelt and extrusion, as discussed above.

It is further highly desirable to maximize the amount of post-consumer recycled material used as source polymer in the manufacture of foamed polymer, regardless of whether or not such material was previously foamed. Since, however, recycled material in general will have been manufactured for different items (from toys, packages, office machines, etc) using as many different processes and process parameters as there are manufacturing plants, the amount of chemical variation in the recycled polymer will be even greater than for the manufacturer's own scrap, presenting all the problems for the prior art processes discussed above. Furthermore for many products, the consumer's use will cause additional variations in the chemistry. For instance exposure to sun or high heat will break down molecules and storing chemicals or food temporarily may affect the polymer. These variations make it more difficult to use the prior art foaming process to foam a post-consumer recycled polymer than to foam plant scrap or pre-consumer recycled plastics.

What is needed is a polymer foam that may be easily rendered to be chemically identical to its unfoamed progenitor. Further, what is needed is a way of producing foamed polymer that does not result in chemical degradation of the polymer. Further required is a way of producing foamed polymer that limits thermal degradation of polymer during processing by using the lowest processing temperatures possible. Yet further, what is needed is a barrier skin for foamed polymeric materials that does not alter the chemistry of the polymer. Further still is required a process that is not limited by the relatively low melt viscosities of polymers that are commonly foamed and that does not result in lowering the melt viscosity of the polymeric material on foaming. Yet further, what is needed is a foaming process that does not employ environmentally detrimental gasses. For truly closed-loop manufacture of materials and articles of foamed polymer, what is needed is a process of foaming polymer that is suitable for foaming substantially all manufacturing scrap material produced in the process as well as recycled pre- and post-consumer plastics of widely varying composition, whether previously foamed or not.

It is known that microcellular foamed polymer may be produced by methods that differ significantly from the blown foaming extrusion method described above. Such foam may be produced in the solid state by a two-step batch process, such as described in U.S. Pat. No. 4,473,665 to Martini-Vvedensky, et al., in which a solid polymer is first exposed to a non-reacting gas, such as carbon dioxide or nitrogen, at elevated pressure for a period of time sufficient to achieve a concentration of gas in the polymer which is sufficient to permit bubble nucleation. After exposure to the gas the polymer is subsequently returned to normal pressure, producing a supersaturated sample, and heated to the foaming temperature, which is above the glass transition temperature of the gas-saturated polymer, thereby causing a large number of bubbles to nucleate in the polymer. The polymer is held at the foaming temperature for a period of time sufficient to achieve foam of the desired density and then cooled to quench bubble nucleation and growth. Because the process is a batch process, however, suitable for production only of single foamed polymer sheets, this technology is of limited applicability to most of foamed polymeric material fabrication, which requires scalable continuous or semi-continuous production of foamed polymeric material.

More recent discoveries have adapted such gas-impregnated foamed polymer technology to "semi-continuous" production processes. In U.S. Pat. No. 5,684,055 to Kumar et al., incorporated herein by reference in its entirety, a roll of polymer sheet is provided with a gas channeling means interleaved between the layers of polymer. The roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymer sheet. After foaming, bubble nucleation and growth is quenched by cooling the foamed polymer sheet.

In U.S. Pat. Nos. 5,223,545 and 5,182,307 Kumar et al., both is incorporated herein by reference in their entirety, PET is shown to have its crystallinity levels raised by saturation with high pressure CO2 gas. Furthermore it has been shown that the crystallizing gas remains in the polymer in substantial quantities after foaming.

It has now been discovered, surprisingly, that the foamed polymer produced by gas impregnation may be reduced to a form that is virtually identical in melt viscosity and average molecular weight to the polymeric resin from which it was formed. Another surprising discovery is that high pressure gas impregnation results in polymer that may be foamed at temperatures significantly lower than the nominal glass liquefaction temperature of non-saturated polymer. Further, successful foaming of gas impregnated polymer is independent of the polymer's melt viscosity and therefore is unaffected by variations in the polymer melt viscosity such as found in recycled material. The gas impregnated foaming process easily accommodates variation in polymer glass transition temperature typically found in recycled material by adjustment of foaming temperature. It has yet further been discovered that relatively impermeable smooth skins may be induced on the surface of the gas impregnated foamed polymeric materials that are comprised of crystallized forms of the polymer itself. It has also been discovered that semi-crystalline polymers, whose crystallinity has been raised by saturation with high pressure CO2 gas, and which are thermoformed while substantial gas remains in the polymer, have their crystallinity levels increased after forming without the need of nucleating additives by using plasticizing gasses as blowing agents. Based upon these discoveries, it is an object of this invention to use a wide range of polymeric materials, including up to 100% pre- and post-consumer recycled plastic and manufacturing scrap, whether of foamed structure using methods of this patent or of solid structure, to make foamed polymeric materials and articles by a closed-loop process of manufacturing by solid state foaming. This and other objects of the invention will be apparent to those skilled in this art from the following detailed description of preferred embodiments of the invention.

BRIEF SUMMARY OF THE INVENTION

The present invention utilizes a solid state process for the closed-loop manufacture of foamed polymer material and thermoformed foamed polymer articles. A roll of polymer sheet, which may comprise up to 100% pre- or post-consumer recycled plastic or manufacturing scrap, is provided with a gas channeling means interleaved between the layers of polymer. The roll is exposed to a non-reacting, but reversibly plasticizing gas at elevated pressure for a period of time sufficient to achieve a desired concentration of high-pressure gas within the polymer. Additionally, the saturation time may be adjusted to achieve the desired level of crystallinity. The saturated polymer sheet is then separated from the gas channeling means and decompressed. In some embodiments, bubble nucleation and growth proceeds spontaneously upon decompression, while in other embodiments bubble nucleation and growth is initiated and enhanced by heating the polymer sheet near to or above the polymer's glass transition temperature. After foaming, bubble nucleation and growth may optionally be quenched by cooling the foamed polymer sheet below the glass transition temperature, if necessary. The formation of optional integral skins of controllably variable thickness and crystallinity may be induced by varying parameters in gas saturation and foaming.

Sheets of polymer foamed according to the foregoing are trimmed if necessary to yield finished foamed polymer material, typically in the form of sheets. For thermoforming polymer articles, the sheet material is preferably fed to a thermoformer while still near its foaming temperature. Additional heat may be applied in the thermoformer prior to forcing the sheet into molds by vacuum, air or mechanical pressure. After forming, additional heat may be applied to increase the crystallinity level to allow high service or operating temperature for the finished objects. Significantly, embodiments of the invention enable increasing crystallinity to a desired level at a much lower temperature than is required to crystallize foamed polymer produced by the prior art. On cooling to the point where it is again somewhat rigid, the molded foam sheet is fed through a trim press where the desired articles are cut from the thermoformed sheet by a punch and die mechanism.

Advantageously, scrap from the entire manufacturing process may be flaked, optionally desiccated, and pelletized to form polymer pellets that may be melted and extruded into rolls of polymer sheets, which are then again provided with a gas channeling means, impregnated with gas, foamed and thermoformed in a closed-loop manufacturing process. Up to 100% of the polymer used to manufacture articles in this process may comprise scrap of solid state foamed polymer, and scrap may be repeatedly reused with minimal degradation of foamed polymer quality.

BRIEF DESCRIPTION OF THE DRAWINGS

Other objects, advantages, features and characteristics of the present invention, as well as methods, operation and function of related elements of structure, and the combination of parts and economies of deployment, will become apparent upon consideration of the following description and claims with reference to the accompanying drawings, all of which form a part of this specification, wherein:

DETAILED DESCRIPTION OF THE INVENTION

The present invention is a general process for the closed-loop production of thermoformed articles comprised of polymer foamed by the gas impregnation method. It is applicable in general to the class of glassy amorphous, non-glassy elastomeric, or semi-crystalline thermoplastic polymers or copolymers. While many descriptions are herein exemplified with PET, it should be recognized that other polymers or mixtures of polymers may be used in place of or in addition to PET. Suitable gas-polymer systems include $CO_2$ and Polypropylene, as disclosed in *$CO_2$-Assisted Crystallization of Polypropylene for Increased Melting Temperature and Crystallinity* by Mitsuko Takada et al, Proceedings of Polymer Processing Society meeting, Hertogenbosh, Netherland, May 31, 1999. Other gases and pressures may be used (for example, $CO_2$ may be used with polyethylene, polyvinyl chloride, acrylonitrile butadiene styrene, polycarbonate, polyethylene terephthalate, and polypropylene; and $N_2$ gas maybe used with polystyrene). It is intended that these teachings should encompass the closed-loop production of foamed articles of any and all such polymers.

Figure 1:
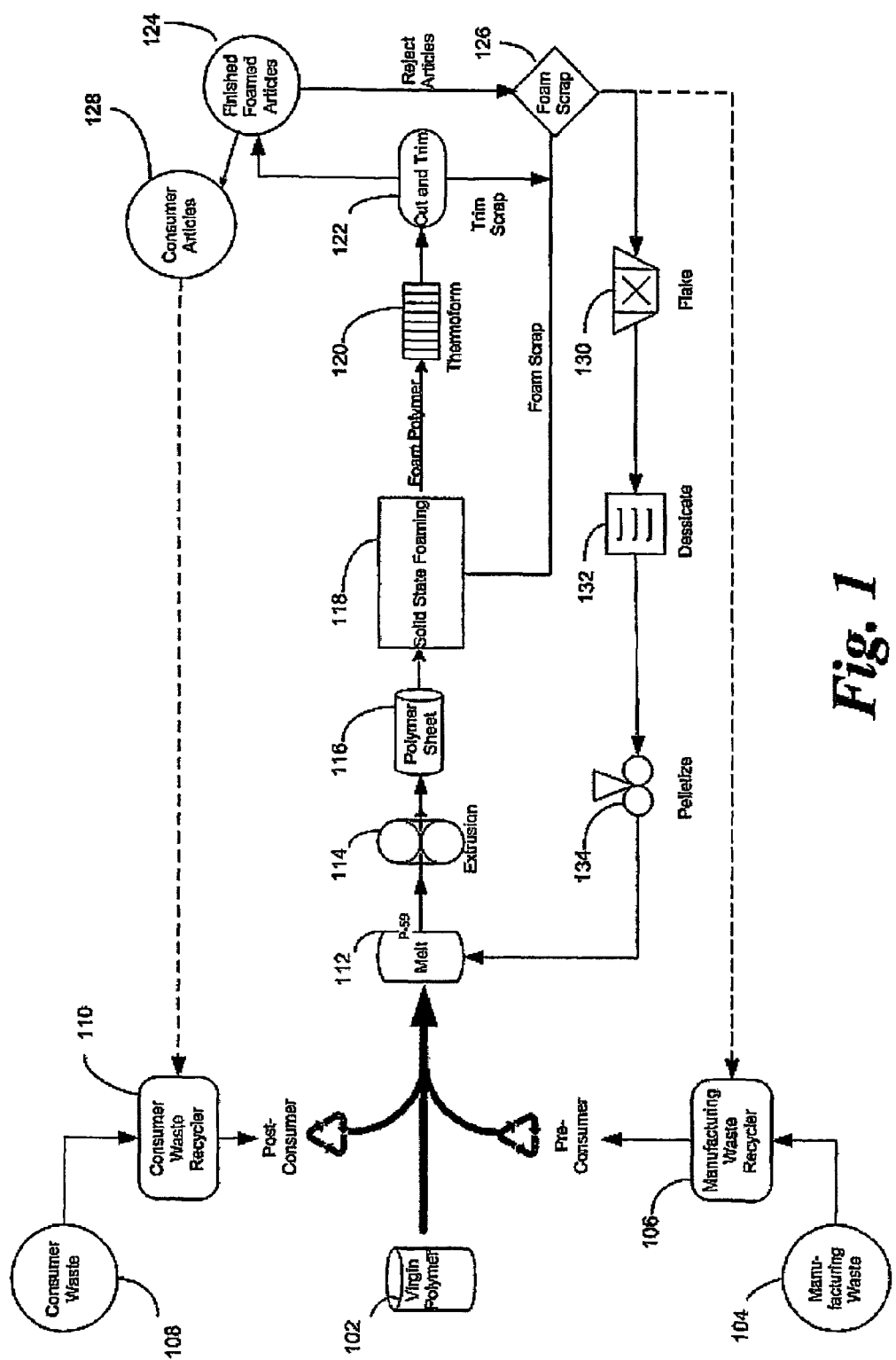
FIG. 1 is a process flow chart for the closed-loop production of foamed polymer articles according to the present invention.

Turning now to FIG. 1, depicted is a general process of closed-loop production of thermoformed articles. Sources of polymer, comprising virgin polymer 102, manufacturing waste 104 in the form of pre-consumer recycled polymer from manufacturing waste recycler 106, and consumer waste 108 in the form of post-consumer recycled polymer from consumer waste recycler 110, are melted 112 and extruded 114 to make sheets of polymer in the form of rolls 116. According to the teaching of this invention, melt mixture 112 may comprise any combination of virgin polymer and pre- and post-consumer recycled thermoplastic, provided such resin may be formed into the rolls or sheets of thermoplastic required as raw material by the present invention. As will be described in greater detail in reference to FIG. 2, sheet polymer 116 is foamed 118 to create foamed polymer material, generally in the form of foamed sheets, that is then thermoformed 120 and trimmed 122 according to methods known in the thermoforming arts, to produce thermoformed foamed articles 124. After rejection of unacceptable finished articles as scrap 126, the remaining articles may be distributed as consumer articles 128, that are in turn recyclable by consumer waste recycler 110 as post-consumer recycled polymer 108 suitable for melting 112 and extrusion 114 to form sheets 116 suitable for further foaming and thermoforming.

Advantageously, any scrap polymer created in the foaming process 118, scrap polymer trimmed from articles 122, as well as any rejected finished articles 124, is reprocessed 126 as scrap. Scrap may be reprocessed in-house by flaking 130, optionally dessicating 132, and pelletizing 134, to yield polymer resin which may then again be melted 112 with or without additional polymer resin 102, 104, 108 and extruded 114 to make rolls of polymer sheet 116 for further foaming and thermoforming. In the alternative, some or all manufacturing scrap 126 may be reprocessed by a manufacturing waste recycler 106 to form pre-consumer recycled polymer 104 suitable for melting 112 and extrusion 114 to form sheets 116 suitable for further foaming and thermoforming.

Figure 2:
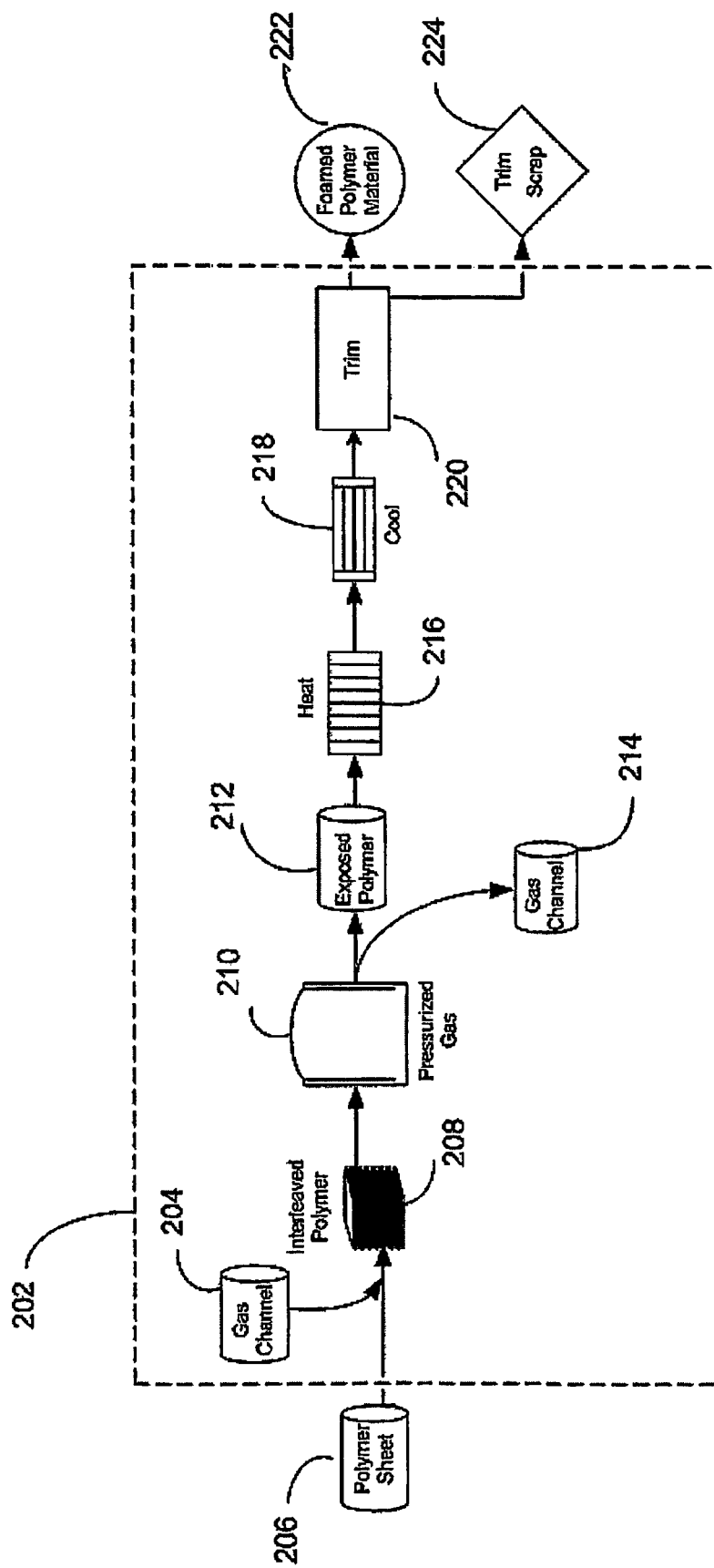
FIG. 2 is a process flow chart for the solid state production of foamed polymer in an embodiment of the present invention.

Next is depicted an embodiment according to the present invention of the foaming process labeled 118 in FIG. 1 above. Turning now to FIG. 2, foaming process 202 comprises interleaving a gas channeling means 204 between layers of polymer 206 (see 106 in FIG. 1), to form an interleaved roll, stack of sheets, or festoon 208 of polymer. Gas channeling means 204 preferably consists of a layer of flexible gas permeable material. While porous paper sheet is a preferred material, other gas permeable materials, such as particulate material, gauze, mesh, and woven or non-woven fabrics, may also be successfully employed in the present invention.

Alternatively, a gas channeling means may be provided mechanically rather than in the form of a gas permeable material. Such mechanical gas channeling means may comprise raised portions such as bumps or ridges attached to or integral in the polymer material. The material may thus be interleaved with itself, the raised portions serving to separate layers of the material for gas penetration.

In any case, interleaved material 208 is next exposed 210 under elevated pressure to a non-reacting gas which is soluble in the polymer for a time sufficient to achieve a desired concentration of gas within the polymer, typically at least 0.5% by weight for PET-CO2 systems. The solvated gas in the polymer will serve as the foaming agent for the material. Thus, the gas-impregnated polymer is nascent foam.

Exposure to pressure 210 is generally carried out at room temperature (around 21 degrees C.). Higher temperatures may be employed to accelerate the rate of diffusion of the gas within the polymer, while lower temperatures may result in higher levels of gas saturation over time as discussed further below. The pressure can be varied above tank supply pressure with booster pumps. For example, the preferred tank pressure range when employing CO2 is about 0.345 to 5.2 MPa. This can be increased to over 8.27 MPa with a suitable booster pump. Pressures as high as 17.2 MPa or higher (supercritical CO2) are usable. The actual pressure chosen will depend on the desired final foam density and average bubble size, as well as on the temperature at which foaming is to take place, as discussed below.

The preferred gas can depend upon the polymer being treated. For example, carbon dioxide is the preferred gas for use in foaming PET, PVC and polycarbonate, while nitrogen is the preferred gas for use in foaming polystyrene. "Modified air", which is atmospheric air in which the percentage oxygen has been reduced to 1% to 20% by reverse osmosis under pressure, as well as pure atmospheric air, may alternatively be employed in some embodiments.

The amount of time during which the polymer roll is exposed to gas varies with the thickness of the solid polymer sheet, the specific polymer-gas system, the saturation pressure, and the diffusion rate into the polymer, and is generally determined experimentally. However, periods of between 3 and 100 hours are typically employed for sheet thicknesses of 0.25 mm to 2 mm. For example, when saturating a 0.5 mm.

thick sheet of PET with $CO_2$, a saturation time of between about 15 to 30 hours is preferred.

In the process taught by Kumar et al. in U.S. Pat. No. 5,684,055, following saturation of the polymer-gas permeable material sheet, the sheet is returned to normal pressure. Significantly, when the sheet is depressurized, the solvated gas begins to dissipate from the polymer 212, facilitating the formation of an integral skin in a manner described in more detail below. For the present discussion, however, it is sufficient to note that maximum foaming is obtained when the gas impregnated polymer is foamed immediately after depressurization, when the polymer contains a maximum amount of solvated gas. For foaming, in some embodiments the polymer sheet is mounted in proximity to a heating station 216, such as a hot water or glycerine bath maintained above the glass transition temperature of the gas-saturated polymer. In such embodiments, the saturated polymer sheet is gradually unwound, separated 214 from the gas permeable material (for those embodiments employing a material as a gas channeling means) and heated by drawing under tension through the heating station 216. The polymer sheet is thereby foamed in a continuous manner. After passing through the heating station 216, the polymer sheet may be drawn through a cooling station 218, such as a cold water bath, a set of chilled rollers or simply air, to cool the polymer and stop bubble nucleation and growth. In such embodiments, the temperature of the heating station 216 as well as the rate at which the polymer sheet is drawn through the heating station 216 and cooling station 218 can be varied to provide sheets of varying bubble size and density. After foaming, the polymer sheet is trimmed 220, resulting in trim scrap 224 and yielding the finished foamed polymer material 222 which may then be thermoformed as described above in reference to FIG. 1.

Surprisingly, it has been found that, while the gas employed is non-reacting and does not alter the polymer chemically, saturation of the polymer with the gas has the effect of reversibly plasticizing the polymer, effectively temporarily reducing its glass transition temperature and enabling some foaming to take place at a temperature that is lower than the polymer's nominal glass transition temperature. In fact, if exposure to gas pressure is takes place at a sufficiently low temperature or at a sufficiently high pressure, the solvated gas pressure in the polymer is sufficient that, upon decompression to atmospheric pressure, desolvation of the gas may overcome the polymer's yield strength at room temperature, causing bubble nucleation and formation, thereby foaming the polymer. In such a case, depending upon degree of foaming desired, it is possible to create the foamed polymeric material entirely without the need for heating 216 and consequent cooling 218 of the material (refer to Example 1 below).

In any case, the polymer, even when foaming is induced by heating, is subjected at most to a temperature near its glass transition temperature according to the present invention, rather than heated to a temperature above its melt temperature as is required for foaming extrusion in the prior art It will be noted by those of skill in the art that glass transition temperatures for unsaturated PET are between about 69 and about 80 deg. C., with a nominal published glass transition temperature of about 74 deg. C. The glass transition temperature for $CO_2$ saturated PET is about 40 to 60 deg. C. By way of contrast, the melt temperature for PET, which is approximately the temperature at which prior art foamed PET is formed, is about 265 deg. C. Similar contrasts between foaming temperature in the present invention and foaming temperature in the prior art apply to other thermoplastic polymers such as polystyrene, PVC, polycarbonate, ABS copolymers and PMMA Because embodiments of the present invention create foamed polymeric material at temperatures well below the melt temperature of the polymer used in the prior art foaming process, the thermo-oxidative degradation of the polymer associated with repeated foaming and reuse in the prior art can be minimized or eliminated entirely, thereby facilitating closed-loop manufacturing of the foamed polymer.

An advantage of this new method includes, among other things, improved detail due to a combined thermoforming-foaming operation. This combined operation allows a small percentage of the foaming (2% to 30%) to take place during contact with the thermoforming die which will create better detail by filling in the die details.

Figure 3:
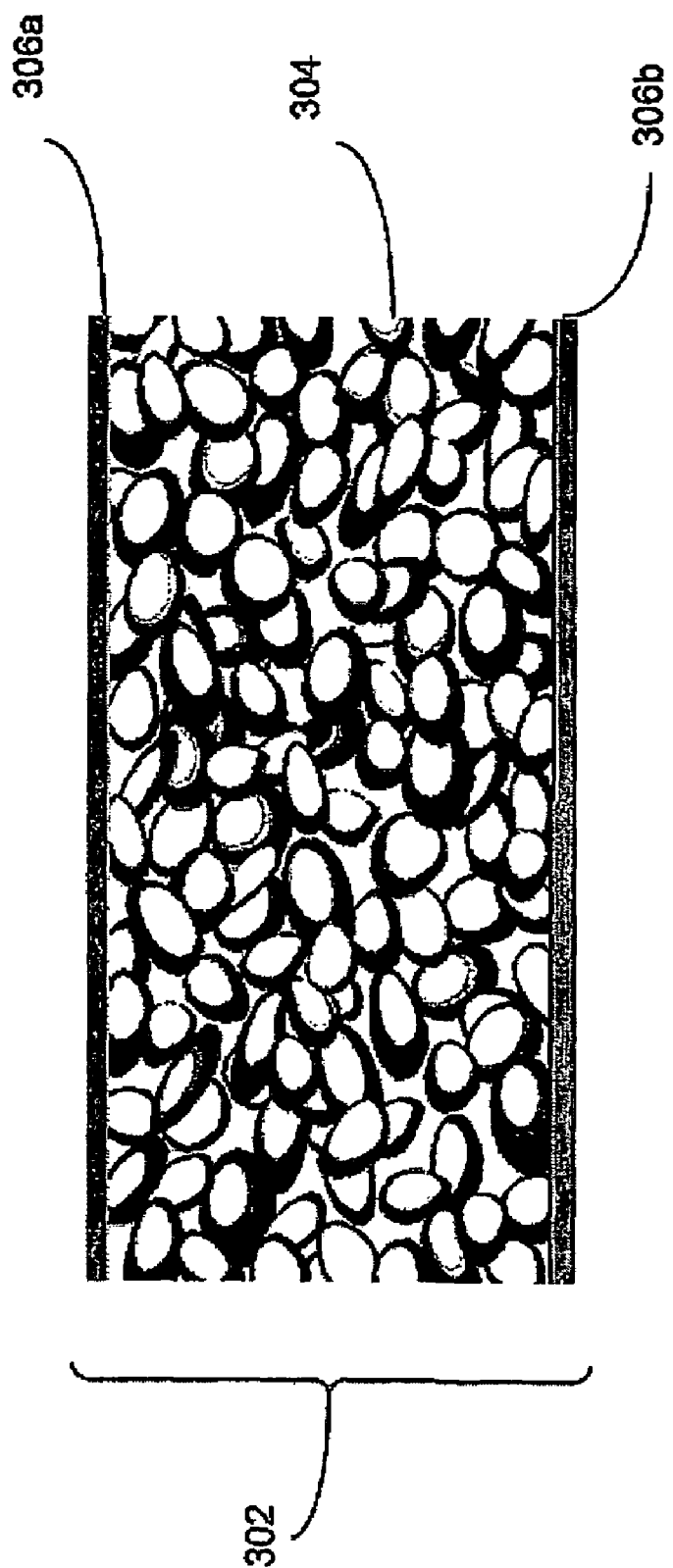
FIG. 3 is a cross-sectional view of a foamed thermoplastic having an integral skin, as produced by the present invention.

Another aspect that facilitates closed-loop manufacturing is the fact that integral skins may be induced in polymeric material foamed according to the present invention. Turning now to FIG. 3, illustrated is a sheet 302 of foamed polymer material. In the center of sheet 302 is foamed polymer 304 which may possess a density of about 10% to about 99.9% of the density of unfoamed polymer. Surfaces 306a and 306b, which may be substantially identical to each other, are solid skins comprised of unfoamed polymer. The thickness of each of skins 306a and 306b may vary from about 3% or less to about 25% or more of the total cross-sectional thickness and can be determined by controlling values of certain manufacturing parameters as set forth below.

Two different processes are involved in the formation of skins on polymeric materials foamed according to the present invention. First, it has been discovered that when materials of semi-crystalline polymers, such as PET, polypropylene and syndiotactic polystyrene, are held under pressure of an inert gas, they tend to crystallize over time, the crystallization proceeding inward from the exposed surface of the polymeric material. Therefore, in such gas-impregnated polymeric materials held under pressure, there is a gradient of crystallinity that declines from the surface to the interior of the material.

Associated with each semi-crystalline polymer is a threshold value for percentage of crystallinity, which, if exceeded, results in material that, even though gas-impregnated, foams at a much higher temperature than the same polymer at lower percentages of crystallinity, if indeed such crystalline gas-impregnated material will foam at all. For PET, for example, the threshold percentage is about 19% crystallinity. As these semi-crystalline polymeric materials are held under inert gas pressure and their crystallinity increases over time from the surface inward, and as the percent crystallinity along the crystallinity gradient of the material increases above this threshold value, the depth of material that will not foam increases. On decompression and optional heating as taught by the present invention, the inner portion of the material that is below the threshold value will foam, while the surface portion of the material that is above the threshold crystallinity value will remain unfoamed, thereby forming a skin of unfoamed polymer having a higher crystallinity than the interior, foamed polymer.

In forming a semi-crystallized skin on the foamed polymer according to the foregoing, referring back to FIG. 3, surfaces 306a and 306b would correspond to portions of the polymeric material that had been crystallized above the threshold value, while foamed inner section 304 corresponds to a portion of the material whose crystallinity is below the threshold value. The semi-crystallized skin possesses attributes generally associated with higher crystallinity in such polymers, such as improved heat resistance, shape stability at high temperature, and strength.

A second process enabling formation of skins on polymeric materials foamed according to the present invention is a result of the fact that the solvated gas desorbs from the polymer surface after decompression. Referring back to FIG. 2, if polymer subsequent to gas impregnation 210 is allowed to desorb a portion of the solvated gas 212 prior to bubble nucleation and formation 216, when the polymer is finally foamed 216, it will possess an integral skin of thickness proportional to the amount of solvated gas that was desorbed.

Such skins can be formed because solvated gas desorbs from the material at its surface, with desorption resulting in a declining gradient of solvated gas concentration in the polymer material closer to the surface of the sheet. As the solvated gas concentration drops in the localized material at the surface, the surface of the polymer sheet to a certain depth is no longer nascent foam and remains unfoamed material during subsequent processing, thereby forming an integral skin. Referring again to FIG. 3, for materials in which skins are formed by this process, 306a and 306b would correspond to areas of the polymer where the solvated gas had desorbed after decompression to the point where the area did not contain sufficient solvated gas to foam, while foamed area 304 would correspond to the interior of the polymeric material where sufficient gas had remained solvated to cause foaming. The depth of this skin depends upon the amount of desorption that has taken place prior to foaming, and therefore is dependent upon temperature, overall pressure, partial gas pressure, and time allowed for the decompressed impregnated polymer to desorb gas prior to foaming. The polymer in skins formed by this second process need not have a level of crystallinity that is appreciably higher than that of the polymer in the foam beneath it. The skin so produced is of the same exact material chemistry as the original polymer.

By controlling variables related to these two processes for skin formation, both the depth and the crystallinity of integral skin formed in polymers foamed according to the present invention may be controlled, whereby the attribute conferred to the material by the skin, such as heat resistance, gas impermeability, stain resistance, enhanced appearance and so on, may be optimized while the material overall possesses the positive attributes of foam. Advantageously, because the integral skin produced by either process is of the same chemical composition as the foamed polymer, unlike laminated skins on foams in the prior art, foamed materials with skins according to the present invention are readily reused in closed-loop manufacturing.

Furthermore, due to the presence of the plasticizing gas after foaming and during thermoforming, by heating foamed objects immediately after thermoforming their crystallinity readily may be increased to a sufficiently high level (typically over 20%) to permit higher service or operating temperatures for objects. While the crystallinity of prior art foamed objects may also be increased by heating, foamed objects produced by the present invention crystallize at significantly lower temperatures than are required for crystallization of prior art foamed objects. For instance, with samples of amorphous recycled PET, it has been found that with CO2 gas at 5 MPA (6.5% by wt gas concentration level), adequate crystallization occurs on heating to only 108-115 deg. C., while the normal CPET crystallizing temperature is in the range of 125-135 deg. C. The effect of lowered crystallization temperature is most pronounced immediately after thermoforming the object. After approximately 3-7 days (depending on thickness and initial gas concentration), most of the gas has left the plastic and the plastic returns to the original glass transition temperature and plasticity of the virgin material.

The utility of foamed objects is greatly enhanced when they are partially crystallized according to the foregoing. Such objects may possess service or operating temperatures as high as 200 deg. C. and therefore are well adapted to many food preparation and service uses as well as other high temperature applications. By way of comparison, the maximum service temperature of non-crystalline PET (commonly called APET) is on the order of only 70 deg. C.

EXAMPLES

Each of the first five examples used samples of 100% recycled polyethylene terephthalate (PET) sheet of 0.457 mm thickness comprised of no more than 58% post-consumer plastic waste.

Example 1

A sample was placed in a vessel pressurized to 6.2 MPa with carbon dioxide where it was held at 15.5 deg. C. for 24 hours and thirty minutes. The sample was then decompressed and allowed to desorb impregnated gas at atmospheric pressure at −13.9 deg. C. for 32 minutes, after which it was warmed to 20 deg. C. in a water bath. Foaming was observed. The density of the resulting foamed polymer relative to solid polymer was measured at 70.0 percent.

Example 2

A sample was treated precisely as the sample in EXAMPLE 1 above, with the exception that the sample was allowed to desorb impregnated gas for 651 minutes prior to warming and foaming. The density of the resulting foamed polymer relative to solid polymer was measured at 79.9 percent. The surface of the sample foamed in this trial was noticeably smoother and glossier than the surface of the sample foamed in Example 1.

Example 3

A sample was placed in a vessel initially pressurized to 3.45 MPa with carbon dioxide where it was held at −21 to −24 deg. C. as carbon dioxide gas pressure was increased to 5.52 MPa over a period of 27 hours and 56 minutes. The sample was then decompressed and allowed to desorb impregnated gas at atmospheric pressure at 21.1 deg. C. for 120 minutes, after which it was warmed in a heated bath to 76.7 deg. C. Foaming was observed. On cooling to room temperature, the density of the resulting foamed polymer relative to solid polymer was measured at 27.1 percent.

Example 4

A sample was placed in a vessel pressurized to 6.2 MPa with carbon dioxide where it was held at 15.5 deg. C. for 24 hours and thirty minutes. The sample was then decompressed and allowed to desorb impregnated gas at atmospheric pressure at 21.1 deg. C. for 22 minutes, after which it was warmed to 96.1 deg. C. in a water bath and then cooled. The density of the resulting foamed polymer relative to solid polymer was measured at 22.3 percent.

Example 5

A sample was placed in a vessel pressurized to 6.2 MPa with carbon dioxide where it was held at 15.5 deg. C. for 24 hours and thirty minutes. The sample was then decompressed and allowed to desorb impregnated gas at atmospheric pressure at −13.9 deg. C. for 354 minutes, after which it was warmed to 99.9 deg. C. in a water bath and then cooled. The density of the resulting foamed polymer relative to solid polymer was measured at 19.5 percent.

The following four examples used 100% Post Consumer scrap Polypropylene.

Example 6

A sample was placed in a vessel pressurized initially to 4.1 MPa and raised to a final pressure of 5.5 MPa over 25 hours and nine minutes with carbon dioxide at 14.4 deg. C. The sample was then decompressed and allowed to desorb impregnated gas at atmospheric pressure for 5 minutes, after which it was warmed to 227 deg. C. in an oil bath and then cooled. The density of the resulting foamed polymer relative to solid polymer was measured at 87 percent.

Example 7

A sample was placed in a vessel pressurized initially to 4.1 MPa and raised to a final pressure of 5.5 MPa over 25 hours and nine minutes with carbon dioxide at 14.4 deg. C. The sample was then decompressed and allowed to desorb impregnated gas at atmospheric pressure for 5 minutes, after which it was warmed to 160 deg. C. with infrared heat. The density of the resulting foamed polymer relative to solid polymer was measured at 52 percent.

Example 8

A sample was placed in a vessel pressurized initially to 5.5 MPa and raised to a final pressure of 6.2 MPa over 26 hours and twenty minutes with carbon dioxide starting at a temperature of −14.4 deg. C. that was gradually lowered to −28 deg C. The sample was then decompressed and allowed to desorb impregnated gas at atmospheric pressure and −12 deg C. for approximately 1 hour, after which it was warmed until significant foaming occurred with infrared heat. The density of the resulting foamed polymer relative to solid polymer was measured at 54 percent.

Example 9

A sample was placed in a vessel pressurized initially to 5.5 MPa and raised to a final pressure of 6.2 MPa over 26 hours and twenty minutes with carbon dioxide starting at a temperature of −14.4 deg. C. that was gradually lowered to −28 deg C. The sample was then decompressed and allowed to desorb impregnated gas at atmospheric pressure and 3 deg C. for 1 hour-20 minutes, after which it was warmed with a 149 deg. C. oil bath for approximately 2 minutes. The density of the resulting foamed polymer relative to solid polymer was measured at 63 percent.

The following three examples used amorphous recycled PET.

Example 10

A sample was placed in a vessel pressurized to 6.2 MPa with carbon dioxide where it was held at 15.5 deg. C. for 24 hours and thirty minutes. The sample was then decompressed and allowed to desorb impregnated gas at atmospheric pressure at −13.9 deg. C. for 37 minutes, after which it was warmed to 121 deg. C. in an oil bath for 2 minutes and then cooled. The density of the resulting foamed polymer relative to solid polymer was measured at 15.6 percent and was foamed with a bend in it. The foam was found to be shape stable when stressed at 188 deg. C. for 10 minutes.

Example 11

A sample was placed in a vessel pressurized to 6.2 MPa with carbon dioxide where it was held at 15.5 deg. C. for 24 hours and thirty minutes. The sample was then decompressed and allowed to desorb impregnated gas at atmospheric pressure at −13.9 deg. C. for 18 minutes, after which it was warmed to 76.7 deg. C. in an oil bath for 2 minutes and then cooled. The polymer was foamed with a bend in it and achieved a density relative to solid polymer of 33 percent. The foam was found not shape stable when stressed at 188 deg. C. for 5 minutes.

Example 12

A sample was placed in a vessel pressurized to 6.2 MPa with carbon dioxide where it was held at 15.5 deg. C. for 24 hours and thirty minutes. The sample was then decompressed and allowed to desorb impregnated gas at atmospheric pressure at −13.9 deg. C. for 385 minutes, after which it was warmed by red-hot infrared heaters for 10 seconds then cooled. The polymer was foamed with a bend in it and achieved a density relative to solid polymer of 12.0 percent. This foam was found to shape stable when stressed at 188 deg C. for 10 minutes.

Conclusions, Ramifications, and Scope

Accordingly, it can be seen that the invention described herein provides a closed-loop process for manufacturing foamed polymer materials and articles. Up to 100% of the material used in such manufacture may comprise pre- or post-consumer recycled material, and such recycled material may further comprise microcellular foams produced according to this invention. Optional integral skins, providing desirable attributes for various applications, may be formed on materials produced by the invention. The crystallinity of objects produced according to the invention may be economically increased by heating the objects subsequent to forming, thereby enhancing the heat resistance of such objects. Because the process does not irreversibly alter the material chemically, all scrap from producing materials and articles according to the invention may be reused to manufacture new materials and articles by the process.

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the claims appended hereto and their equivalents.

We claim:

1. A process for making a shaped article of manufacture from a sheet or roll of a thermoplastic material, wherein the thermoplastic material consists essentially of a virgin thermoplastic material admixed with a previously foamed thermoplastic material, wherein the virgin material and the previously foamed thermoplastic material are of the same chemical composition, and wherein the previously foamed thermoplastic material is in an amount that ranges from about 5% to about 100% by weight of the thermoplastic material, the process comprising at least the following steps:

(a) pressurizing the sheet or roll of the thermoplastic material with a plasticizing gas under a selected pressure and period of time sufficient to yield a reversibly plasticized thermoplastic material, the plasticized thermoplastic material being impregnated with the plasticizing gas;

(b) depressurizing the plasticized thermoplastic material to thereby desorb some of the plasticizing gas from the plasticized thermoplastic material to thereby yield a partially desorbed plasticized thermoplastic material;

(c) partially foaming the partially desorbed plasticized thermoplastic material to yield a plasticized and partially foamed thermoplastic material; and (d) thermoforming-foaming, while in a thermoforming mold, the plasticized and partially foamed thermoplastic material into the shaped article of manufacture, wherein the step of thermoforming-foaming occurs before the impregnated plasticizing gas concentration falls below about 0.5 percent by weight of the plasticized and partially foamed thermoplastic material, and wherein the plasticized and partially foamed thermoplastic material is additionally foamed by an amount ranging from 2% to 30%.

2. The process of claim 1 wherein the thermoplastic material consists essentially of polyethylene terephthalate (PET).

3. The process of claim 2 wherein the plasticizing gas is carbon dioxide ($CO_2$).

4. The process of claim 3 wherein the shaped article has a width to depth ratio of greater than about 1:1.

5. The process of claim 1 wherein the shaped article of manufacture has an outer skin layer and a foamed interior.

6. The process of claim 1 wherein the shaped article of manufacture is a cup having a wall angle of less than about 35 degrees from vertical.

7. The process of claim 1 wherein the selected pressure ranges from about 0.345 MPa to about 17.2 MPa, and the selected period of time ranges from about 3 hours to about 100 hours.

8. The process of claim 1 further comprising, after the step of thermoforming-foaming, a step of additional heating to thereby increase the crystallinity level of the shaped article of manufacture.

* * * * *